United States Patent
Kobayashi et al.

(10) Patent No.: US 12,176,692 B2
(45) Date of Patent: Dec. 24, 2024

(54) ELECTRICAL JUNCTION BOX

(71) Applicants: YAZAKI CORPORATION, Tokyo (JP); TOYOTA JIDOSHA KABUSHIKI KAISHA, Toyota (JP)

(72) Inventors: Kazuki Kobayashi, Kakegawa (JP); Kohei Toyoshima, Kakegawa (JP); Kenji Segawa, Kakegawa (JP); Naoki Tozuka, Kakegawa (JP); Hiroyuki Yokoyama, Toyota (JP)

(73) Assignees: YAZAKI CORPORATION, Tokyo (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 201 days.

(21) Appl. No.: 17/994,563

(22) Filed: Nov. 28, 2022

(65) Prior Publication Data
US 2023/0170679 A1    Jun. 1, 2023

(30) Foreign Application Priority Data
Nov. 30, 2021 (JP) ................................ 2021-194469

(51) Int. Cl.
H02G 3/08 (2006.01)
(52) U.S. Cl.
CPC .................... *H02G 3/081* (2013.01)
(58) Field of Classification Search
None
See application file for complete search history.

(56) References Cited

U.S. PATENT DOCUMENTS

| | | | | |
|---|---|---|---|---|
| 4,973,797 A | * | 11/1990 | Jorgensen | H02G 3/088 174/53 |
| 5,272,279 A | * | 12/1993 | Filshie | H02B 1/46 174/56 |
| 6,462,270 B1 | * | 10/2002 | Depp | H02G 3/081 174/59 |
| 2002/0134572 A1 | * | 9/2002 | Matsumura | H01H 85/044 174/66 |
| 2005/0241715 A1 | * | 11/2005 | Suzuki | B60R 16/0215 138/156 |

(Continued)

FOREIGN PATENT DOCUMENTS

JP    3-106819 U    11/1991
JP    8-107618 A    4/1996
(Continued)

*Primary Examiner* — Krystal Robinson
(74) *Attorney, Agent, or Firm* — Sughrue Mion, PLLC

(57) ABSTRACT

An electrical junction box includes a body having an accommodation space, a first cover attached around a pivot shaft of the body to cover a part of the accommodation space, a second cover attached to the body to cover another part of the accommodation space and a conductor portion to transmit electric power. The first cover includes an interfering portion to move around the pivot shaft in accordance with pivoting of the first cover when the first cover is being opened or closed. The second cover includes an interfered portion to be arranged on a movement locus of the interfering portion when the second cover is closed, and not arranged on the movement locus when the second cover is opened. The conductor portion includes a portion arranged in the part of the accommodation space and to be isolated from the outside by the first cover.

8 Claims, 7 Drawing Sheets

(56) References Cited

U.S. PATENT DOCUMENTS

| | | | | |
|---|---|---|---|---|
| 2006/0089020 A1* | 4/2006 | Kanamaru | ............... | H01R 9/24 |
| | | | | 439/76.2 |
| 2017/0305370 A1 | 10/2017 | Yamashita | | |
| 2023/0117716 A1* | 4/2023 | Wada | ................... | H05K 5/0217 |
| | | | | 361/679.01 |

FOREIGN PATENT DOCUMENTS

| | | | |
|---|---|---|---|
| JP | 2013-215035 A | 10/2013 |
| JP | 2016-67090 A | 4/2016 |
| JP | 2016-96605 A | 5/2016 |

* cited by examiner

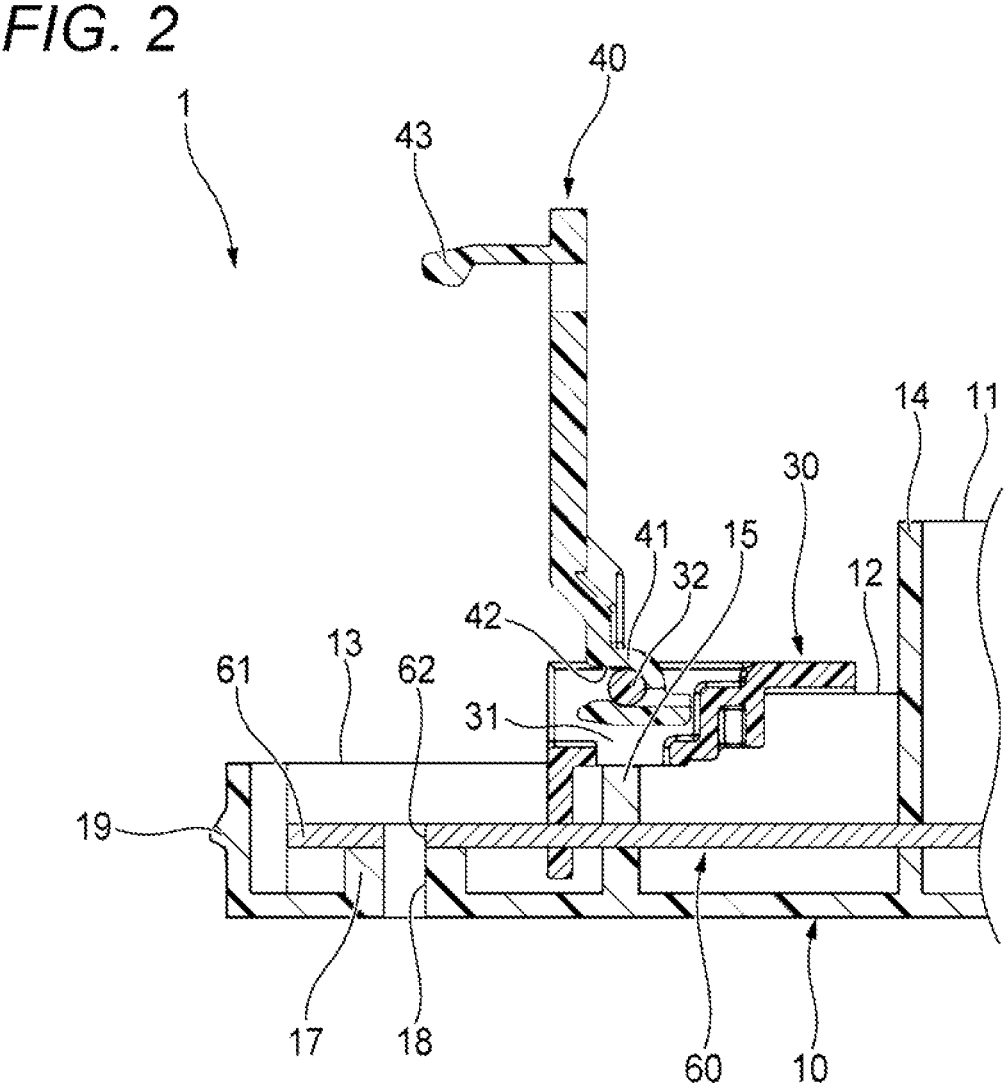
FIG. 2
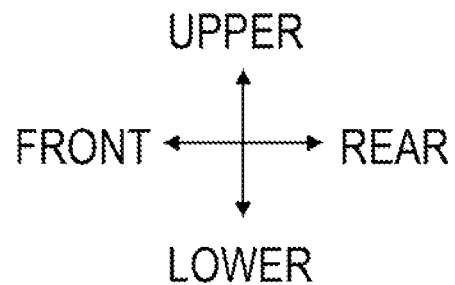

ELECTRICAL JUNCTION BOX

CROSS-REFERENCE TO RELATED APPLICATION

The present application claims priority to Japanese Patent Application No. 2021-194469 filed on Nov. 30, 2021, the entire content of which is incorporated herein by reference.

TECHNICAL FIELD

The presently disclosed subject matter relates to an electrical junction box including a box-shaped body having an accommodation space therein, an openable and closable first cover covering a portion of the accommodation space, an openable and closable second cover covering another portion of the accommodation space, and a conductor portion for transmitting electric power.

BACKGROUND

In related art, there has been an electrical junction box mounted on a vehicle, such as a relay box, which has therein an accommodation space for accommodating electronic components such as relay or fuse, and a bus bar or the like for supplying power to the electronic components (see, for example, JP2016-067090A and JPH03-106819U).

Incidentally, electrical junction boxes of the above-described type may be designed such that, for example, a part of the bus bar is exposed to the accommodation space for the bust bar to be electrically connected to an external terminal for power supply (so-called LA terminal, stud bolt, or the like). In this case, the connection portion between the external terminal and the bus bar is normally covered with a cover so that the operator or the like does not touch the exposed part of the bus bar (i.e., a live part) by mistake during power supply. From the viewpoint of strengthening prevention of erroneous touch of the operator or the like on the live part, it is conceivable to firmly fix the cover to the body of the electrical junction box when the cover is closed. However, if the cover is fixed too firmly, it is difficult to open the cover at the time of maintenance such as replacement of parts, which may impair the maintainability of the electrical junction box. As described above, it is generally difficult to achieve both the prevention of erroneous touch on the live part of the electrical junction box and the improvement of maintainability of the electrical junction box.

SUMMARY

Illustrative aspects of the presently disclosed subject matter provide an electrical junction box capable of achieving both the prevention of erroneous touch on the live part of the electrical junction box and the improvement of maintainability of the electrical junction box.

In order to achieve the object described above, an electrical junction box according to the presently disclosed subject matter is characterized as follows.

According to an illustrative aspect of the presently disclosed subject matter, an electrical junction box includes a body having an accommodation space therein, a first cover pivotably attached around a pivot shaft of the body, the first cover being configured to open and close and to cover a part of the accommodation space, a second cover attached to the body, the second cover being configured to open and close and to cover another part of the accommodation space and a conductor portion configured to transmit electric power supplied from an outside of the body. The first cover includes an interfering portion configured to move around the pivot shaft in accordance with pivoting of the first cover when the first cover is being opened or closed. The second cover includes an interfered portion to be arranged on a movement locus of the interfering portion when the second cover is in a closed state, and not arranged on the movement locus when the second cover is in an open state. The conductor portion includes a portion arranged in the part of the accommodation space and to be isolated from the outside by the first cover.

Other aspects and advantages of the presently disclosed subject matter will be apparent from the following description, the drawings and the claims.

BRIEF DESCRIPTION OF DRAWINGS

FIG. 2 is a cross-sectional view taken along line A-A of FIG. 1;

DESCRIPTION OF EMBODIMENTS

Hereinafter, an electrical junction box 1 according to an embodiment of the presently disclosed subject matter illustrated in FIG. 1 will be described with reference to the drawings. The electrical junction box 1 is typically a relay box having an internal space for accommodating electronic components 50 (see FIG. 1) such as relay and fuse, and is used in a state of being electrically connected and fixed to an external device 2 (see FIG. 1) mounted on the vehicle.

Hereinafter, for convenience of description, "front", "rear", "left", "right", "upper", and "lower" are defined as illustrated in FIGS. 1 to 7. The "front-rear direction", the "left-right direction", and the "upper-lower direction" are orthogonal to each other. When the electrical junction box 1 is mounted on a vehicle, the "front-rear direction", the "left-right direction", and the "upper-lower direction" respectively correspond to the front-rear direction, the left-right direction, and the upper-lower direction of the vehicle. A side facing the inside of the electrical junction box 1 is referred to as an "inner" side, and a side facing the outside of the electrical junction box 1 is referred to as an "outer" side.

Figure 1:
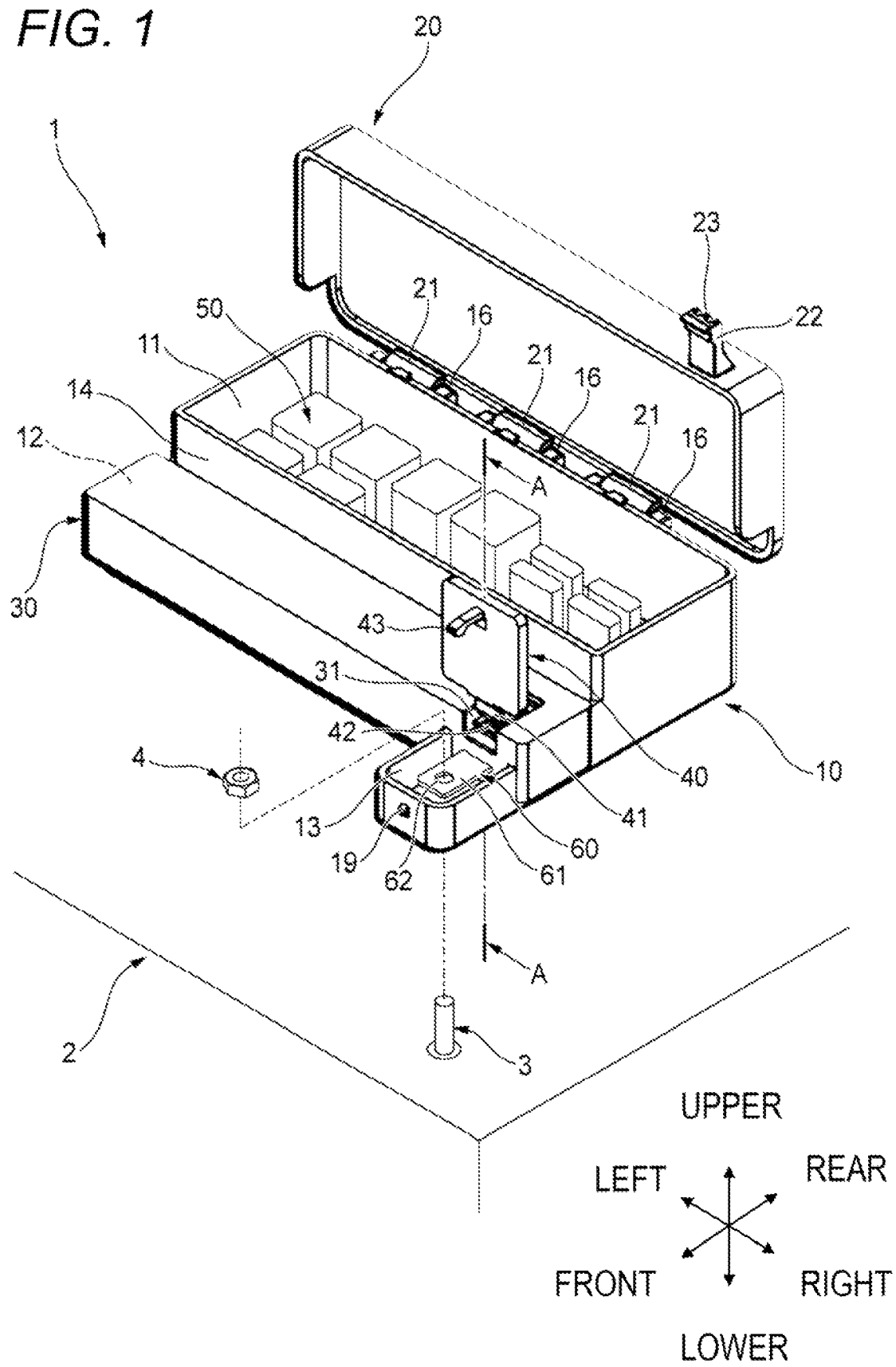
FIG. 1 is a perspective view showing an electrical junction box according to an embodiment of the presently disclosed subject matter.

As shown in FIGS. 1 and 2, the electrical junction box 1 includes a housing 10, a large cover 20 pivotably attached to the housing 10, an intermediate cover 30 attached to the housing 10, and a small cover 40 pivotably attached to the housing 10. The housing 10 and the intermediate cover 30 correspond to the "body" of the presently disclosed subject matter, the large cover 20 corresponds to the "second cover" of the presently disclosed subject matter, and the small cover 40 corresponds to the "first cover" of the presently disclosed subject matter. Hereinafter, the components constituting the electrical junction box 1 will be described in order.

First, the housing 10 will be described. The housing 10 is a resin molded body, and as illustrated in FIGS. 1 and 2, integrally includes a first accommodation portion 11, a second accommodation portion 12, and a third accommodation portion 13. The first accommodation portion 11 has a rectangular parallelepiped box shape, opens upward and elongated in the left-right direction. The second accommodation portion 12 (see FIG. 2) is arranged adjacent to the front side of the first accommodation portion 11 to be aligned with the first accommodation portion 11 in the front-rear direction, and has a rectangular parallelepiped box shape open upward and is elongated in the left-right direction. The third accommodation portion 13 is arranged to extend forward from the front right end of the second accommodation portion 12, and has a rectangular parallelepiped box shape open upward.

The first accommodation portion 11 and the second accommodation portion 12 are partitioned by a partition wall 14 (see FIGS. 1 and 2) extending in the left-right direction to serve also as a front side wall of the first accommodation portion 11 and a rear side wall of the second accommodation portion 12. The second accommodation portion 12 and the third accommodation portion 13 are partitioned by a partition wall 15 (see FIG. 2) extending in the left-right direction to serve also as a front side wall of the second accommodation portion 12 and a rear side wall of the third accommodation portion 13. In this example, the upper end opening of the first accommodation portion 11 is positioned above the upper end opening of the second accommodation portion 12, and the upper end opening of the second accommodation portion 12 is positioned above the upper end opening of the third accommodation portion 13.

A plurality of types of electronic components 50 (see FIG. 1) such as relay and fuse and a bus bar (metal plate) 60 for supplying power to the plurality of types of electronic components 50 are accommodated in the internal space of the first accommodation portion 11 and the second accommodation portion 12. A part of the bus bar 60 accommodated in the internal space of the first accommodation portion 11 and the second accommodation portion 12 extends forward toward the third accommodation portion 13 (see FIG. 2), and the extending end thereof is positioned in the internal space of the third accommodation portion 13. A part of the bus bar 60 positioned in the internal space of the third accommodation portion 13 is exposed to the outside through the upper end opening of the third accommodation portion 13, and functions as a so-called live part 61.

As shown in FIG. 2, the bottom wall of the third accommodation portion 13 is provided with a base 17 protruding upward to support the live part 61 of the bus bar 60 from below. A through hole 62 provided in the live part 61 and a through hole 18 provided in the base 17 form one continuous through hole that is continuous in the upper-lower direction. Into the continuous through hole, a stud bolt 3 (see FIG. 1) of the external device 2 (see FIG. 3) is to be inserted. The outer face of the side wall extending in the left-right direction on the front side of the third accommodation portion 13 is provided with a locking protrusion 19 (see FIGS. 1 and 2).

As shown in FIG. 1, the upper end of the outer face of the side wall extending in the left-right direction on the rear side of the first accommodation portion 11 is integrally provided with a plurality of (in this example, three) pivot shafts 16 extending in the left-right direction in a manner arranged coaxially with each other at different positions in the left-right direction. The plurality of pivot shafts 16 are engaged with a plurality of bearings 21 of the large cover 20 (see FIG. 1), which will be described later.

Next, the large cover 20 will be described. The large cover 20 is a resin molded body, and is a member attached to the first accommodation portion 11 of the housing 10 in a manner pivotable between an open state shown in FIG. 1 and a closed state shown in FIG. 7 to close the upper end opening of the first accommodation portion 11 in the closed state. The large cover 20 corresponds to the upper end opening of the first accommodation portion 11, and has a substantially rectangular parallelepiped box shape open downward in the closed state and elongated in the left-right direction.

As shown in FIG. 1, the side edge extending in the left-right direction on the rear side in the closed state of the large cover 20 is integrally provided with a plurality of (in this example, three) bearings 21 corresponding to the plurality of pivot shafts 16 of the housing 10, such that the bearings 21 are coaxially arranged at different positions in the left-right direction. When the plurality of bearings 21 of the large cover 20 are respectively engaged with the plurality of pivot shafts 16 of the housing 10, the large cover 20 is attached to the housing 10 to be pivotable around the plurality of bearings 21.

Figure 7:
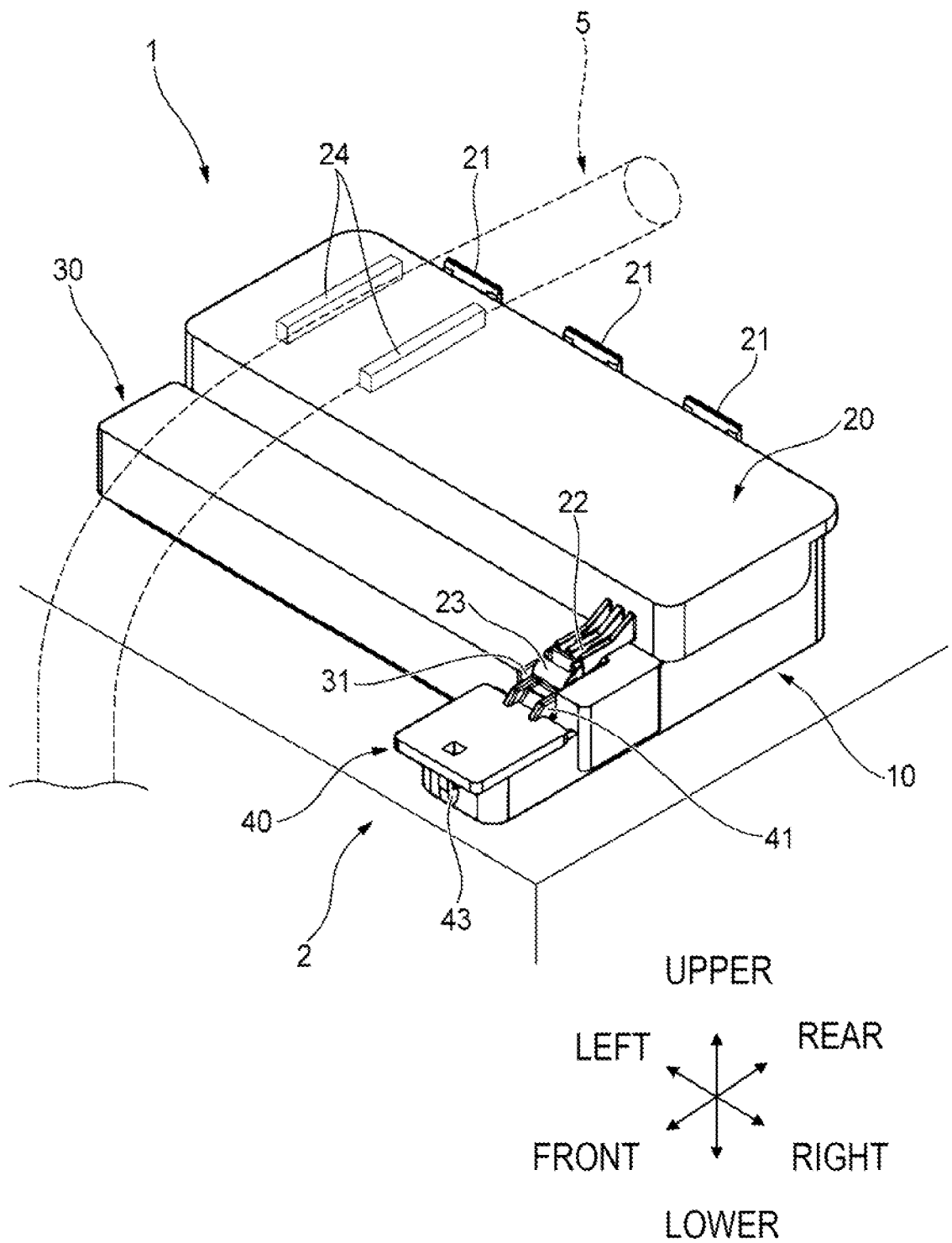
FIG. 7 is a view corresponding to FIG. 1, showing a state in which the electrical junction box is fixed to the external device, the small cover and the large cover are in a closed state, and the electric wire is routed while being guided along the upper face of the large cover by guide portions provided on the large cover.

The right end of the side edge that extending in the left-right direction on the front side in the closed state of the large cover 20 is integrally provided with a protruding portion 22 that protrudes forward in the closed state. A distal end 23 of the protruding portion 22 corresponds to the "interfered portion" of the presently disclosed subject matter. The effects due to the provision of the protruding portion 22 will be described later. Further, as shown in FIG. 7, the upper face (outer face) in the closed state of the large cover 20 is integrally provided with a pair of guide portions 24 protruding and extending in the front-rear direction with an interval in the left-right direction therebetween. The effects due to the provision of the guide portions 24 will also be described later.

Next, the intermediate cover 30 will be described. The intermediate cover 30 is a resin molded body, and is a member attached to the second accommodation portion 12 of the housing and functioning to close the upper end opening of the second accommodation portion 12. The intermediate cover 30 corresponds to the upper end opening of the second accommodation portion 12, and has a substantially rectangular parallelepiped box shape open downward and elongated in the left-right direction. The intermediate cover 30 is attached to the second accommodation portion 12 from above (see FIG. 1). When the intermediate cover 30 is attached to the second accommodation portion 12, the upper end opening of the second accommodation portion 12 is closed.

As shown in FIGS. 1 and 2, the right end of the upper wall of the intermediate cover 30 is provided with a recess 31 recessed downward in correspondence with the protruding portion 22 of the large cover 20 and the third accommodation portion 13. The recess 31 extends in the front-rear direction from the front end of the upper wall of the intermediate cover 30 to an intermediate position in the front-rear direction. Therefore, the recess 31 opens upward and forward. Further, as shown in FIG. 2, the intermediate cover 30 is integrally provided with a pivot shaft 32 extending in the left-right direction to traverse the upper region of the internal space of the recess 31 in the left-right direction.

The pivot shaft 32 is engaged with a bearing 41 of the small cover 40 (see FIG. 1), which will be described later.

Next, the small cover 40 will be described. The small cover 40 is a resin molded body, and is a member attached to the third accommodation portion 13 of the housing 10 in a manner pivotable between an open state shown in FIG. 1 and a closed state shown in FIG. 7 to close the upper end opening of the third accommodation portion 13 in the closed state. The small cover has a substantially rectangular flat plate shape corresponding to the upper end opening of the third accommodation portion 13.

As shown in FIGS. 1 and 2, the side edge extending in the left-right direction on the rear side in the closed state of the small cover 40 is integrally provided with the bearing 41 in correspondence with the pivot shaft 32 of the intermediate cover 30. The bearing 41 is provided with a groove 42 open downward and extending in the left-right direction in the closed state of the small cover 40 (see FIG. 2). A position in the vicinity of the front end of the lower face in the closed state of the small cover 40 is integrally provided with a locking piece 43 extending downward in the closed state in correspondence with the locking protrusion 19 of the third accommodation portion 13 of the housing 10 (see FIG. 1).

When the bearing 41 of the small cover 40 is inserted into the recess 31 of the intermediate cover 30 attached to the housing 10 and the groove 42 of the bearing 41 is engaged with the pivot shaft 32 of the intermediate cover 30, the small cover 40 is attached to the intermediate cover 30 (that is, the housing 10) to be pivotable around the bearing 41. In the state in which the small cover 40 is attached to the housing 10, the bearing 41 moves (pivots) around the pivot shaft 32 in the internal space of the recess 31 in accordance with the pivoting of the small cover 40. Therefore, the rear end 41a (see FIG. 6) of the bearing 41 in the closed state of the small cover 40 also moves (pivots) around the pivot shaft 32 in the internal space of the recess 31 in accordance with the pivoting of the small cover 40. The end 41a of the bearing 41 corresponds to the "interfered portion" of the presently disclosed subject matter. The operation of the end 41a of the bearing 41 will be described later.

In the closed state of the small cover 40 (see FIG. 7), the locking piece 43 of the small cover 40 and the locking protrusion 19 of the housing 10 are engaged with each other, so that the closed state of the small cover 40 is maintained. By applying an upward external force of a predetermined magnitude or more to the front end edge of the small cover 40 in the closed state, the engagement between the locking piece 43 and the locking protrusion 19 is released easily, and the small cover 40 can be opened easily.

As described above, by attaching the large cover 20, the intermediate cover 30, and the small cover 40 to the housing 10, the assembly of the electrical junction box 1 is completed, and the electrical junction box 1 illustrated in FIG. 1 is obtained. The electrical junction box 1 for which the assembly has been completed is attached to the external device 2 mounted on the vehicle.

Figure 3:
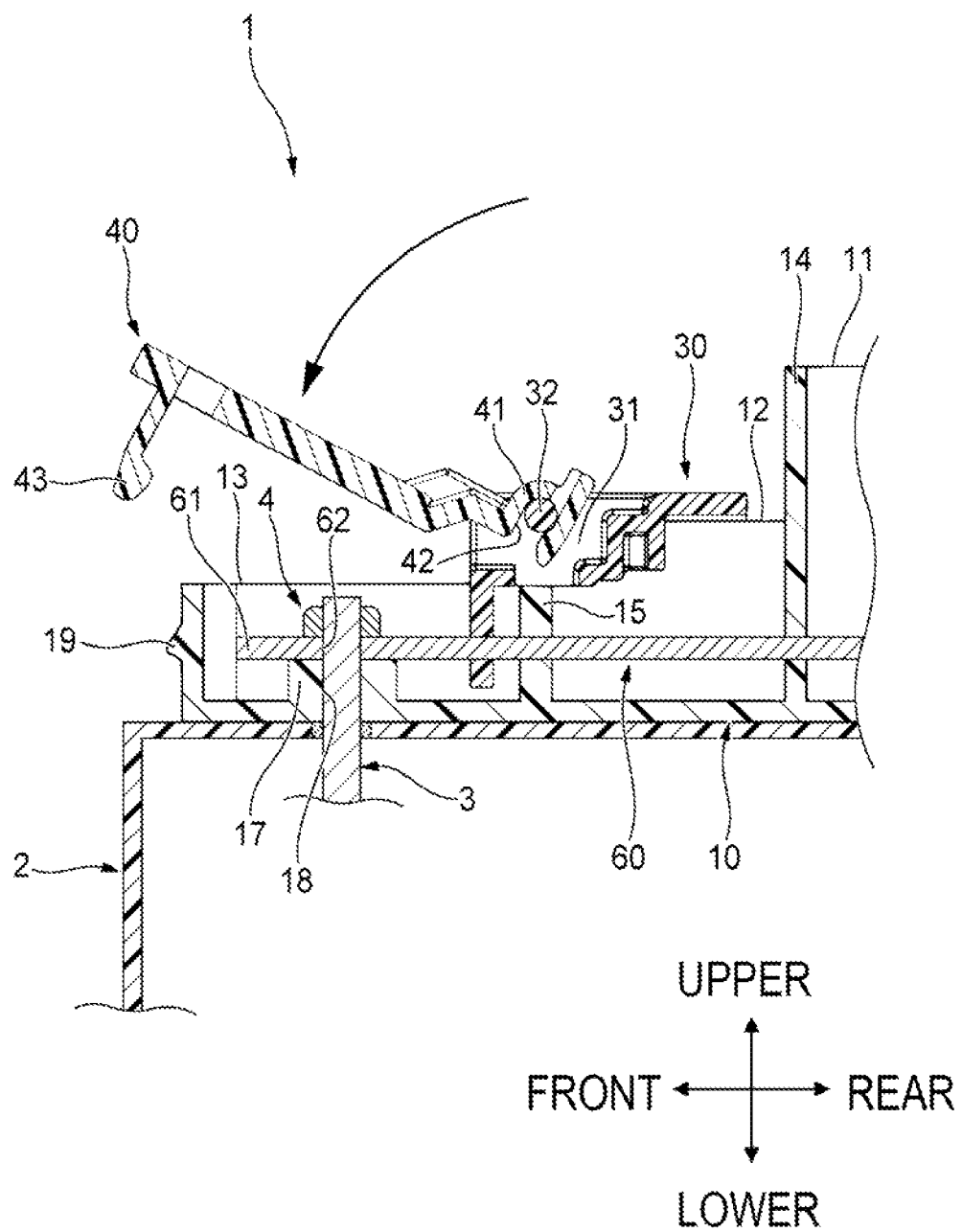
FIG. 3 is a view corresponding to FIG. 2, showing a state in which a small cover is being closed after the electrical junction box is electrically connected to and fixed to an external device.

Therefore, first, as shown in FIGS. 1 and 3, in a state in which the large cover 20 and the small cover 40 are maintained in the open state, the stud bolt 3 provided in the external device 2 (see also FIG. 1) is inserted into the above-described continuous through hole of the electrical junction box 1 (the through hole 18 and the through hole 62) from below, and is fastened and fixed to the live part 61 which is a part of the bus bar 60 of the electrical junction box 1 by using a nut 4 (see also FIG. 1). As a result, as shown in FIG. 7, the electrical junction box 1 is electrically connected and fixed to the external device 2. As a result, the assembly of the electrical junction box 1 to the external device 2 is completed, and power can be supplied from the external device 2 to the plurality of types of electronic components 50 accommodated in the electrical junction box 1 via the stud bolt 3 and the bus bar 60.

After the assembly of the electrical junction box 1 to the external device 2 is completed, the small cover 40 is closed as indicated by the arrow in FIG. 3. As a result, the live part 61, which is a part of the bus bar 60, is covered with the small cover 40 to be isolated from the outside. In the state in which the small cover 40 is closed, as shown in FIG. 4, the upper end opening of the recess 31 positioned rearward of the bearing 41 is exposed to the outside.

Figure 4:
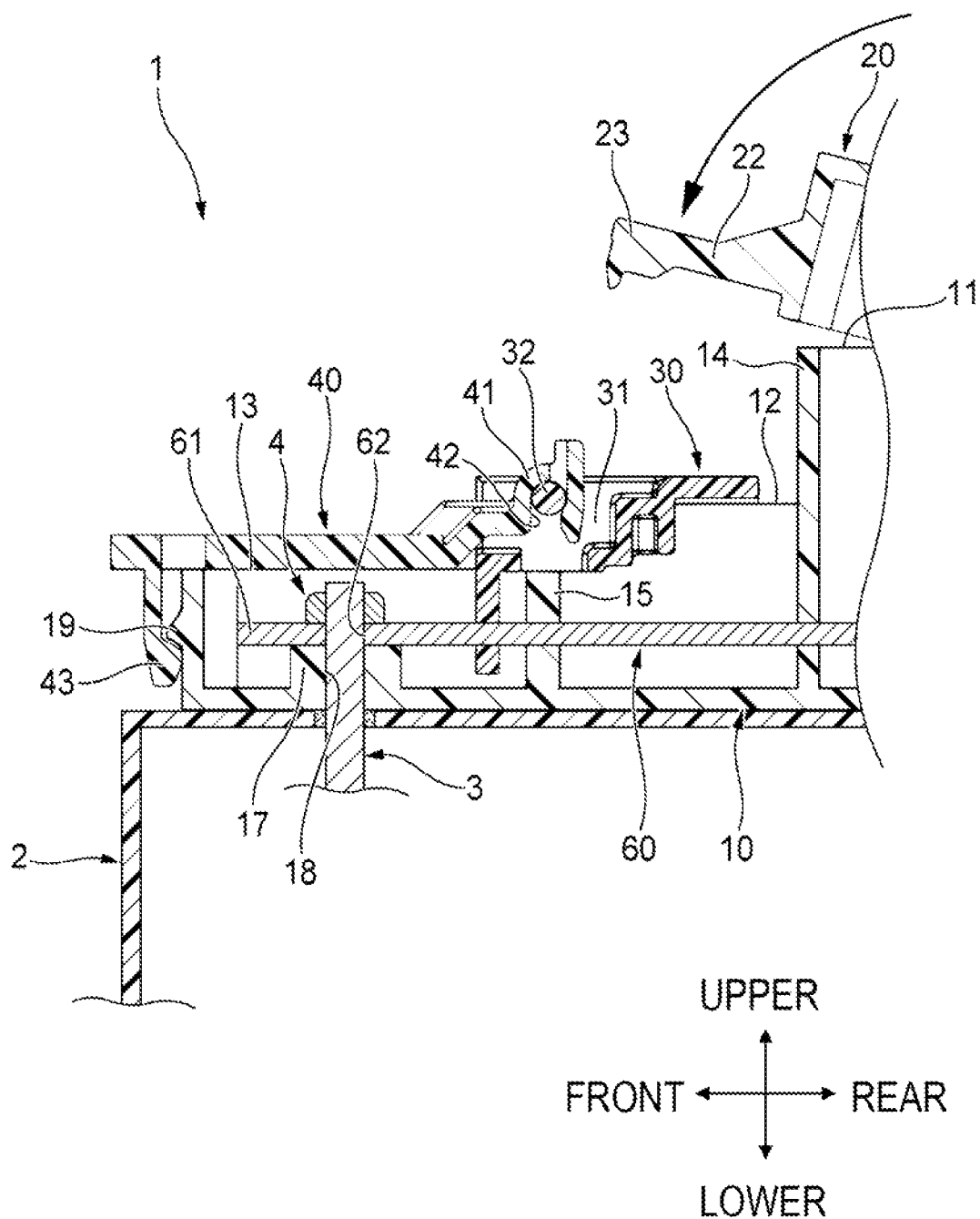
FIG. 4 is a view corresponding to FIG. 2, showing a state in which a large cover is being closed after the small cover has been closed.
Figure 5:
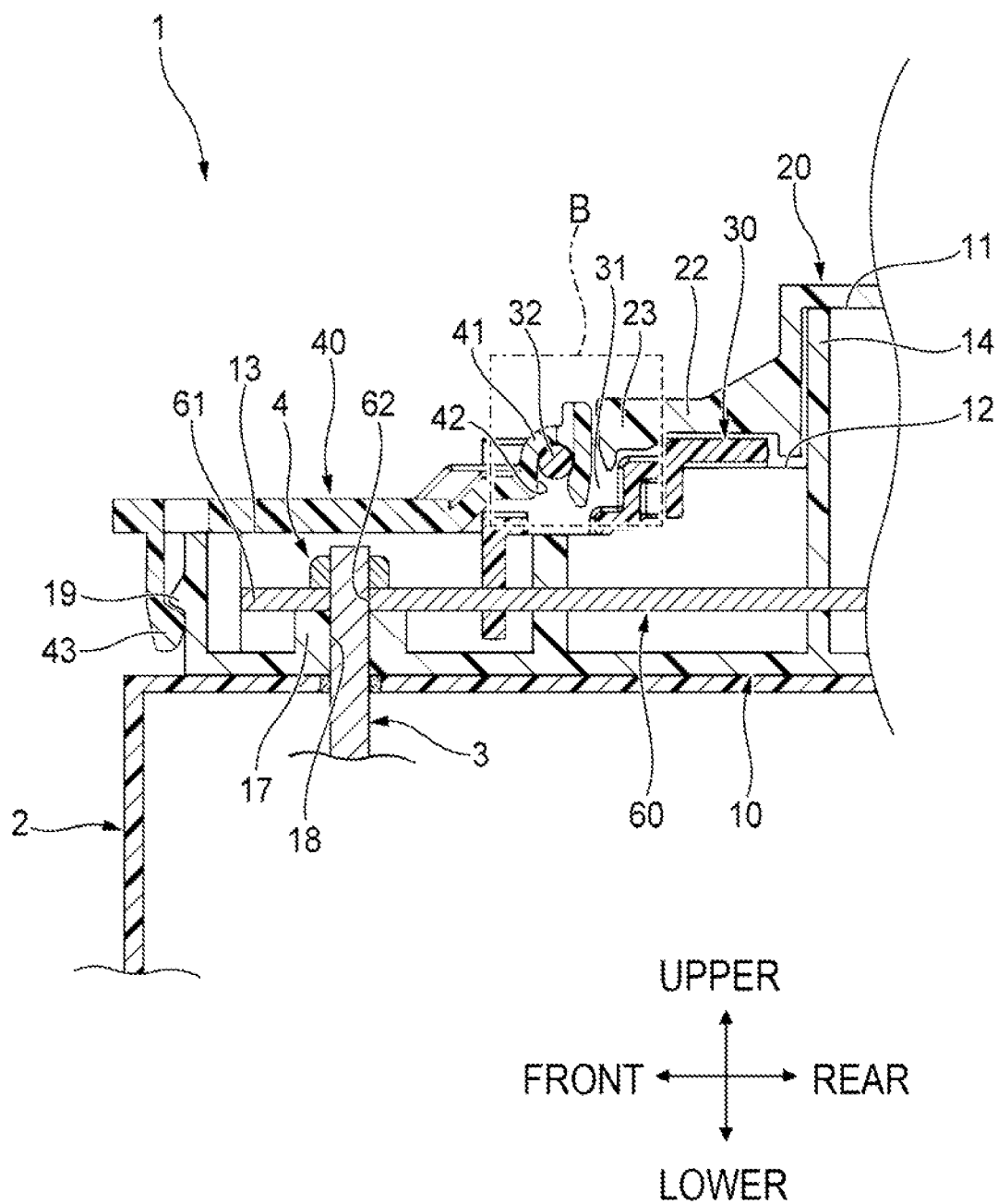
FIG. 5 is a view corresponding to FIG. 2, showing a state in which the small cover and the large cover are closed.
Figure 6:
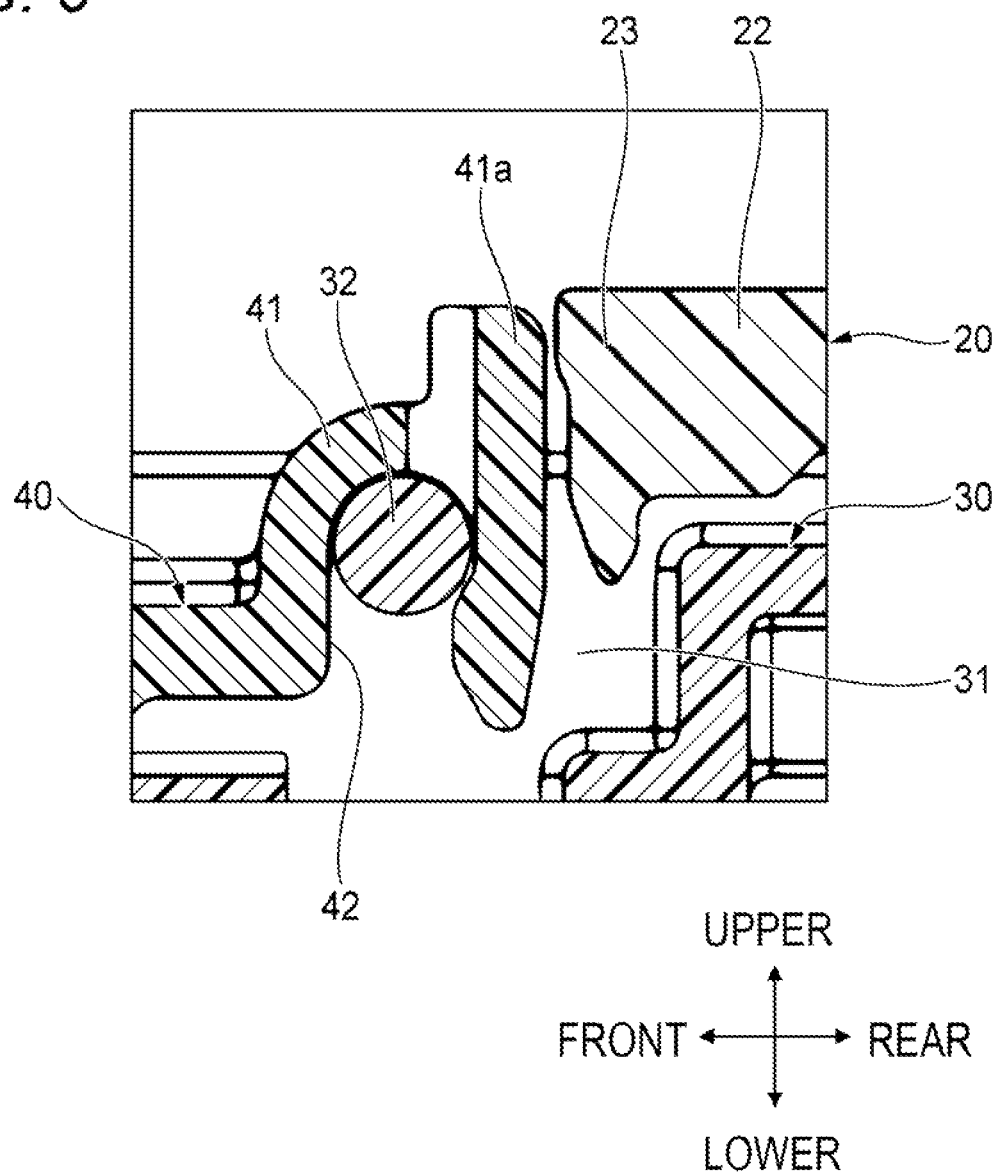
FIG. 6 is an enlarged view of a portion B in FIG. 5.

After the small cover 40 is closed, the large cover 20 is closed as indicated by the arrow in FIG. 4. As a result, both the small cover 40 and the large cover 20 are closed. As shown in FIGS. 5 and 6, in the state in which both the small cover 40 and the large cover 20 are closed, the distal end 23 of the protruding portion 22 of the large cover 20 is arranged in the opening portion of the recess 31 to close the upper end opening of the recess 31 positioned rearward of the bearing 41, and is arranged on the movement locus of the end 41a of the bearing 41 during the pivoting of the small cover 40.

Since the distal end 23 of the protruding portion 22 is arranged on the movement locus of the end 41a of the bearing 41, even if the small cover 40 is to be opened, the small cover 40 cannot be opened due to the end 41a of the bearing 41 interfering with the distal end 23 of the protruding portion 22. In other words, in order to open the small cover 40 from the state in which the small cover 40 and the large cover 20 are both closed, first, it is necessary to open the large cover 20 so that the distal end 23 of the protruding portion 22 of the large cover 20 is not arranged on the movement locus of the end 41a of the bearing 41.

Further, by arranging the distal end 23 of the protruding portion 22 in the opening portion of the recess 31, it is possible to prevent foreign matter or the like from entering the recess 31. This prevents the intended opening and closing operation of the small cover 40 from being hindered by the foreign matter or the like.

In the electrical junction box 1 attached to the external device 2 mounted on the vehicle and in the state in which both the small cover 40 and the large cover 20 are closed, as shown in FIG. 7, an electric wire 5 extending from an on-vehicle electrical component (not shown) such as another electrical junction box is routed while being guided along the upper face of the large cover 20 by the pair of guide portions 24 provided on the large cover 20. By arranging the electric wire 5 in this way, the large cover 20 can be prevented from being opened erroneously. In other words, as long as the electric wire 5 is not removed for maintenance or the like, the large cover 20 is maintained in the closed state, and the state in which the distal end 23 of the protruding portion 22 is arranged on the movement locus of the end 41a of the bearing 41 is maintained, so that the small cover 40 is prevented from opening. As a result, when the electrical junction box 1 is in use, erroneous touch by the operator or the like on the live part 61, which is a part of the bus bar 60, is prevented. On the other hand, at the time of maintenance, the small cover 40 can be opened by detaching the electric wire 5 and opening the large cover 20.

As described above, according to the electrical junction box 1 of the present embodiment, the small cover 40 that covers the upper end opening of the third accommodation portion 13 of the electrical junction box 1 is pivotably attached around the pivot shaft 32 provided to the intermediate cover 30 fixed to the housing 10. The small cover 40 has the end 41*a* (interfering portion) of the bearing 41 that moves around the pivot shaft 32 at the time of opening or closing. On the other hand, the distal end 23 (interfered portion) of the protruding portion 22 of the large cover 20 covering the upper end opening of the first accommodation portion 11 of the electrical junction box 1 is arranged on the movement locus of the end 41*a* of the bearing 41 when the large cover 20 is in the closed state, and is not arranged on the movement locus when the large cover 20 is in the open state. Therefore, as long as the large cover 20 is in the closed state, the opening of the small cover 40 is prevented by the action of the end 41*a* of the bearing 41 and the distal end 23 of the protruding portion 22. Therefore, when the electrical junction box 1 is mounted on a vehicle or the like in a state in which the external electric wire 5 is routed on the large cover 20 to prevent the large cover 20 from being opened erroneously, the large cover 20 is prevented from opening as long as the electric wire 5 is not detached due to the maintainability or the like. On the other hand, at the time of maintenance, the small cover can be opened or closed by detaching the electric wire 5 and opening the large cover 20. Therefore, erroneous touch of the operator or the like on the live part 61 which is a part of the bus bar 60 when the electrical junction box 1 is used is prevented without fixing the small cover to the housing 10 too firmly. As described above, the electrical junction box 1 according to the present embodiment can achieve both the prevention of erroneous touch on the live part 61 of the electrical junction box 1 and the improvement of maintainability of the electrical junction box 1.

Further, when the small cover 40 is to be opened, the end 41*a* of the bearing 41 of the small cover 40 is received in the recess 31 provided in the intermediate cover 30. Therefore, a disadvantage such as narrowing of the movable range of the small cover 40 due to the end 41*a* of the bearing 41 provided in the small cover 40 is unlikely to occur. Further, when the large cover 20 is in the closed state, the distal end 23 of the protruding portion 22 of the large cover is arranged in the opening portion of the recess 31. Therefore, the entry of foreign matter or the like into the recess 31 is prevented, and the intended opening and closing operation of the small cover 40 is prevented from being hindered by the foreign matter or the like.

Further, the large cover 20 has the pair of guide portions 24 for guiding the electric wire routed outside the large cover 20. Therefore, when the electrical junction box 1 is mounted on a vehicle or the like, the opening and closing of the small cover 40 and the large cover 20 are naturally restricted as long as the electric wire 5 is routed along the pair of guide portions 24. Therefore, it is possible to prevent the small cover 40 from being opened erroneously without requiring a special work for the operator.

In the above-described embodiment, the "body" of the presently disclosed subject matter includes the housing 10 and the intermediate cover 30 separate from the housing 10 and attached to the housing 10. On the other hand, the "body" of the presently disclosed subject matter may be formed of an integrated body (resin molded body) in which a member corresponding to the housing 10 and a member corresponding to the intermediate cover 30 are formed integrally.

In the above embodiment, the large cover 20 is attached to the housing 10 to be pivotable around the plurality of bearings 21. On the other hand, as long as the large cover 20 is an openable and closable cover that covers the upper end opening of the first accommodation portion 11 of the housing 10, the large cover 20 may have any structure for attaching to the housing 10.

In the above embodiment, the upper face of the large cover 20 is provided with the protruding guide portions 24. On the other hand, the side faces of the large cover 20 may be provided with the guide portions 24, or the distal end or the middle of an arm extending from the upper face or the side face of the large cover 20 may be provided with the guide portions 24. In the above-described embodiment, the large cover 20 (and hence the small cover 40) is restricted from opening by the electric wire 5. However, the large cover 20 may be restricted from opening by using some structural body other than the electric wire 5 present around the location where the electrical junction box 1 is mounted.

According to an aspect of the embodiments described above, an electrical junction box (1) includes a body (10, 30) having an accommodation space (11, 12, 13) therein, a first cover (40) pivotably attached around a pivot shaft (32) of the body (30), the first cover being configured to open and close and to cover a part (13) of the accommodation space, a second cover (20) attached to the body (10), the second cover being configured to open and close and to cover another part (11) of the accommodation space and a conductor portion (60) configured to transmit electric power supplied from an outside of the body (10, 30). The first cover (40) includes an interfering portion (41*a*) configured to move around the pivot shaft (32) in accordance with pivoting of the first cover (40) when the first cover (40) is being opened or closed. The second cover (20) includes an interfered portion (23) to be arranged on a movement locus of the interfering portion (41*a*) when the second cover (20) is in a closed state, and not arranged on the movement locus when the second cover (20) is in an open state. The conductor portion (60) includes a portion (61) arranged in the part (13) of the accommodation space and to be isolated from the outside by the first cover (40).

According to the electrical junction box having the above-described configuration, the first cover covering the part of the accommodation space of the electrical junction box is attached to the body to be pivotable around the pivot shaft. The first cover includes the interfering portion that moves around the pivot shaft when the first cover is to be opened or closed. On the other hand, the interfered portion of the second cover covering the other part of the accommodation space of the electrical junction box is arranged on the movement locus of the interfering portion when the second cover is in the closed state, and is not arranged on the movement locus when the second cover is in the open state. Therefore, when the second cover is in the closed state, the first cover is prevented from opening by the operation of the interfering portion and the interfered portion. Therefore, when the electrical junction box is to be mounted on a vehicle or the like, for example, by routing an external electric wire or the like on the second cover such that the second cover is kept in the closed state, the second cover is in the closed state as long as the electric wire is not detached due to maintenance or the like, so that the first cover is prevented from opening. On the other hand, at the time of maintenance, the first cover can be opened by simply removing the electric wire. Therefore, it is possible to prevent erroneous touch of the operator or the like on the conductor portion (that is, a portion that can serve as the live part) without fixing the first cover to the body portion too firmly. As described above, the electrical junction box of the present configuration can achieve both the prevention of erroneous touch on the live part of the electrical junction box and the improvement of maintainability of the electrical junction box.

The body (30) may include a receiving portion (31) opened to receive the interfering portion (41a) when the first cover (40) is being opened, and the interfered portion (23) of the second cover (20) may be arranged at an opening portion of the receiving portion (31) when being in the closed state, and may not be arranged at the opening portion when in the open state.

With this configuration, the interfering portion of the first cover is received by the receiving portion provided in the body when the first cover is to be opened. Therefore, a disadvantage such as narrowing of the movable range of the first cover due to the interfering portion provided in the first cover is unlikely to occur. Further, the interfered portion of the second cover is arranged in the opening portion of the receiving portion when the second cover is in the closed state. Therefore, the entry of foreign matter or the like into the receiving portion is prevented, and the intended opening and closing operation of the first cover is prevented from being hindered by the foreign matter or the like.

The second cover (20) may include a guide portion (24) configured to guide an electric wire (5) routed outside the accommodation space (11).

With this configuration, the second cover includes the guide portion for guiding the electric wire routed outside the accommodation space. Therefore, when the electrical junction box is mounted on a vehicle or the like, the opening and closing of the first cover and the second cover are naturally restricted as long as the electric wire is routed along the guide portion. Therefore, it is possible to prevent the first cover from being opened erroneously without requiring a special work for the operator.

What is claimed is:

1. An electrical junction box comprising:
    a body having an accommodation space therein;
    a first cover pivotably attached around a pivot shaft of the body, the first cover being configured to open and close and to cover a part of the accommodation space;
    a second cover attached to the body, the second cover being configured to open and close and to cover another part of the accommodation space; and
    a conductor portion configured to transmit electric power supplied from an outside of the body, wherein
    the first cover includes an interfering portion configured to move around the pivot shaft in accordance with pivoting of the first cover when the first cover is being opened or closed,
    the second cover includes an interfered portion that blocks the first cover from opening, by being arranged on a movement locus of the interfering portion, when the second cover is in a closed state, and not when the second cover is in an open state, and
    the conductor portion includes a portion arranged in the part of the accommodation space and to be isolated from the outside by the first cover.

2. The electrical junction box according to claim 1, wherein
    the body includes a receiving portion opened to receive the interfering portion when the first cover is being opened, and
    the interfered portion of the second cover is to be arranged at an opening portion of the receiving portion when being in the closed state, and not to be arranged at the opening portion when in the open state.

3. The electrical junction box according to claim 1, wherein
    the second cover includes a guide portion configured to guide an electric wire routed outside the accommodation space.

4. The electrical junction box according to claim 1, wherein the first cover is smaller than the second cover.

5. The electrical junction box according to claim 1, wherein
    the first cover comprises a locking piece configured to lock the first cover closed, and
    in a state in which the first cover is locked closed, the pivot shaft is closer to the second cover than is the locking piece to the first cover.

6. The electric junction box according to claim 1, wherein the second cover is configured to open and close by pivoting around one or more bearings of the body.

7. An electrical junction box comprising:
    a body having an accommodation space therein;
    a first cover pivotably attached around a pivot shaft of the body, the first cover being configured to open and close and to cover a part of the accommodation space;
    a second cover attached to the body, the second cover being configured to open and close and to cover another part of the accommodation space; and
    a conductor portion configured to transmit electric power supplied from an outside of the body, wherein
    the first cover includes an interfering portion configured to move around the pivot shaft in accordance with pivoting of the first cover when the first cover is being opened or closed,
    the second cover includes an interfered portion to be arranged on a movement locus of the interfering portion when the second cover is in a closed state, and not arranged on the movement locus when the second cover is in an open state,
    the conductor portion includes a portion arranged in the part of the accommodation space and to be isolated from the outside by the first cover,
    the body includes a receiving portion opened to receive the interfering portion when the first cover is being opened, and
    the interfered portion of the second cover is to be arranged at an opening portion of the receiving portion when being in the closed state, and not to be arranged at the opening portion when in the open state.

8. An electrical junction box comprising:
    a body having an accommodation space therein;
    a first cover pivotably attached around a pivot shaft of the body, the first cover being configured to open and close and to cover a part of the accommodation space;
    a second cover attached to the body, the second cover being configured to open and close and to cover another part of the accommodation space; and
    a conductor portion configured to transmit electric power supplied from an outside of the body, wherein
    the first cover includes an interfering portion configured to move around the pivot shaft in accordance with pivoting of the first cover when the first cover is being opened or closed,
    the second cover includes an interfered portion to be arranged on a movement locus of the interfering portion when the second cover is in a closed state, and not arranged on the movement locus when the second cover is in an open state, the conductor portion includes a portion arranged in the part of the accommodation space and to be isolated from the outside by the first cover, and the second cover includes a guide portion configured to guide an electric wire routed outside the accommodation space.

\* \* \* \* \*